United States Patent [19]

Ebihara

[11] 4,414,284

[45] Nov. 8, 1983

[54] TWO LAYER SINTERED PISTON RING WITH A REST-CURVE LIKE BOUNDARY

[75] Inventor: Tadashi Ebihara, Hatogaya, Japan

[73] Assignee: Nippon Piston Ring Co., Ltd., Tokyo, Japan

[21] Appl. No.: 351,570

[22] Filed: Feb. 23, 1982

[30] Foreign Application Priority Data

Feb. 26, 1981 [JP] Japan ................................. 56-26118

[51] Int. Cl.³ ........................... F16J 9/20; B22F 7/02; B32B 7/00
[52] U.S. Cl. .................................... 428/550; 428/548; 75/246; 419/2; 419/7; 277/223; 277/235 R
[58] Field of Search ................ 428/550, 548; 264/111, 264/113; 75/214, 246; 419/2, 7; 277/188 R, 216, 223, 224, 235 R

[56] References Cited

U.S. PATENT DOCUMENTS

| | | |
|---|---|---|
| 2,753,858 | 7/1956 | Honeyman et al. ............ 428/566 X |
| 3,198,856 | 8/1965 | Hammond et al. ............. 264/113 X |
| 3,938,814 | 2/1976 | Cromwell ..................... 428/550 |

FOREIGN PATENT DOCUMENTS 47-27814 10/1972 Japan .

Primary Examiner—Benjamin R. Padgett
Assistant Examiner—Matthew A. Thexton
Attorney, Agent, or Firm—Sughrue, Mion, Zinn, Macpeak, and Seas

[57] ABSTRACT

A piston ring produced by a powder metallurgical method has a nearly triangular zone in cross section made of a low density sintered alloy metal powder. One edge of an outer peripheral surface or bottom surface of the piston ring forms a vertex of the triangular zone. The remainder of the piston ring is composed of a high density sintered alloy metal powder. This piston ring has a high abrasion resistance at the area thereof which slides on the cylinder wall and can be produced at low cost.

4 Claims, 10 Drawing Figures

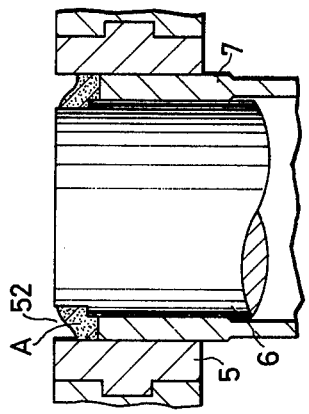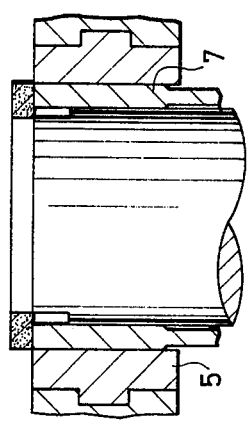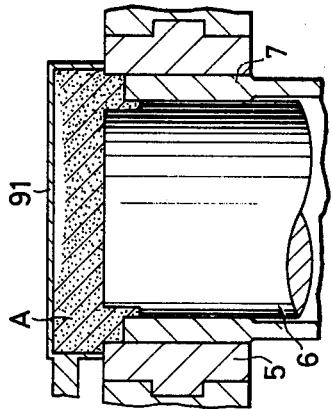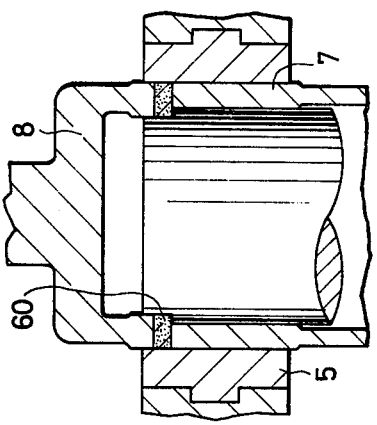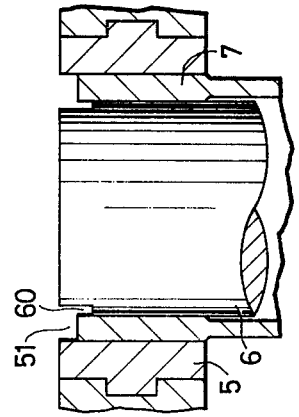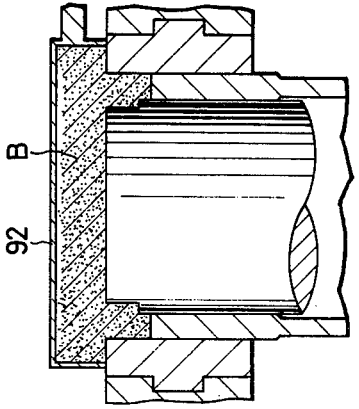

TWO LAYER SINTERED PISTON RING WITH A REST-CURVE LIKE BOUNDARY

BACKGROUND OF THE INVENTION

1. Field of the Invention

The present invention relates to a piston ring for use in an internal combustion engine or for a reciprocating piston of a compressor, a shock absorber or the like. More particularly, it is concerned with a piston ring made of a sintered alloy.

2. Description of the Prior Art

As illustrated in FIG. 1, since a piston ring 3 slides on the cylinder wall with the axial movement of a piston, an outer peripheral surface 31 of the piston ring 3 is required to have good abrasion resistance. Particularly, in the case of a piston ring for use in an internal combustion engine, a bottom surface 32 of the piston ring 3 is required to have good abrasion resistance since it is pressed onto a groove 4 by the pressure in the combustion room.

With one type of conventional piston ring, a hard chromium plating or sprayed coating of abrasion resistant material is applied all over the outer and inner peripheral surfaces of a parent material of cast iron as well as all over the bottom and top surfaces thereof. This surface coating is applied after the piston ring is molded. Therefore, the number of working steps and the time necessary for working this conventional piston is increased.

As far back as the nineteen-fourties, a piston ring formed of sintered alloy was developed in England. Since that time, various types of sintered alloys have been employed in piston rings.

One conventional piston ring is made entirely of a parent material which comprises a sintered alloy having good abrasion resistance. Generally, as disclosed in Japanese patent publication No. Sho 45-32803, a single kind of powder is used for molding and sintering. In this latter type of piston ring, the number of working steps and working costs is reduced. However, the starting materials required for producing the high abrasion resistant parent materials are expensive. Furthermore, these high abrasion resistant sintered alloys have inferior strength because of the high carbon content thereof. Therefore, these piston rings require additional surface treatments such as infiltration and sulfurizing.

In order to overcome the above described defects of piston rings made of sintered alloys, a piston ring having different material layers have been proposed.

Composite techniques and methods have been developed wherein piston rings have a plurality of layers. Because of the composite structure, the piston rings function well and the cost for the raw materials for these piston rings is reduced.

One such composite sintered alloy piston ring is attained by stacking a plurality of powder layers when molding the powders. According to U.S. Pat. Nos. 2,753,858 and 2,753,859, after a first powder is pressurized and molded. a second powder is filled over the first pressurized powder layer. Making piston rings using this technique is complicated.

For example, a composite piston ring as illustrated in FIG. 2 is known. The piston ring of FIG. 2 comprises a second sintered alloy layer 2 having excellent abrasion resistance and a first sintered alloy layer 1 made of a usual low alloyed metal which is laminated on the second sintered alloy layer 2. In this composite piston, however, the volume of the second sintered alloy layer 2 is large which still results in rather large material costs. Furthermore, the first sintered alloy layer 1 is required to have a high density to maintain sufficient strength over the operational life of the piston ring. Therefore, the first sintered alloy is made of a low alloyed metal. On the other hand, the second sintered alloy layer 2 is required to have a low density so that lubricating oil can enter voids existing in the second layer 2 to increase the abrasion resistance thereof. Therefore, as the volume of the second layer 2 is increased and the volume of the first layer 1 decreased, the strength of the piston ring is reduced.

Further, as another example of a complicated technique for making sintered alloys, Japanese patent publication No. Sho-51-39166 discloses a method for producing a sintered alloy having multiple layers by dividing a die into a plurality of pieces. This technique can be applied to make a variety of mechanical parts such as those shown in Japanese patent publication No. 54-31963 and Japanese patent application publication (OPI) No. 54-23810. In publication No. 51-39166, the powder layers for sintering are not only arranged vertically or horizontally, but also arranged by forming different powder material layers at specific portions of the mechanical parts such as at corners to enchance the mechanical properties of the mechanical parts and to reduce the cost of the raw materials required. However, according to the prior art, a plurality of punch means are required to make such complicated structures and therefore the punching strength of the press machine is weak and the operational sequence followed to make the mechanical parts is complicated. As a result, the dimensional accuracy of the resultant mechanical part is low. Oftentimes, the mechanical part thus formed is not suitable for being put into practical use.

SUMMARY OF THE INVENTION

The present invention is intended to overcome the above described problems of the conventional sintered alloy piston rings.

The present invention is a piston ring produced by a powder metallurgical method which has a nearly triangular zone composed of a second sintered alloy. One edge of an outer peripheral surface or bottom surface of the triangular zone of the piston ring forms a vertex of the triangular zone. The remaining part of the piston ring is composed of a first sintered alloy.

BRIEF DESCRIPTION OF THE DRAWINGS

FIGS. 4(a)-(f) are a series of working steps illustrating a process for the production of a piston ring of the ivention.

DESCRIPTION OF THE PREFERRED EMBODIMENT

Figure 3:
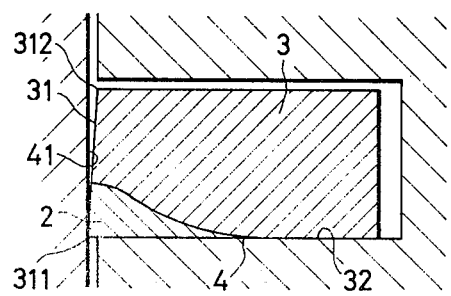
FIG. 3 is a cross-sectional view of a piston ring of the invention.

Referring to FIG. 3 illustrating a cross-section of a piston ring of the invention, a nearly triangular zone is composed of a second sintered alloy 2. An edge 311 of an outer peripheral surface of the cross-section of the piston ring 3 forms a vertex of the triangular zone. The triangular surface can also be formed in the other side of the piston ring in which case the edge 312 forms the vertex of the triangular zone. The other zone 3 of the cross-section of the piston ring is composed of a first sintered alloy 1.

Figure 1:
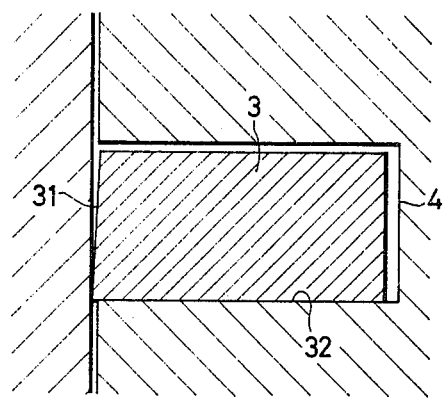
FIGS. 1 and 2 are cross-sectional views of conventional piston rings.
Figure 2:
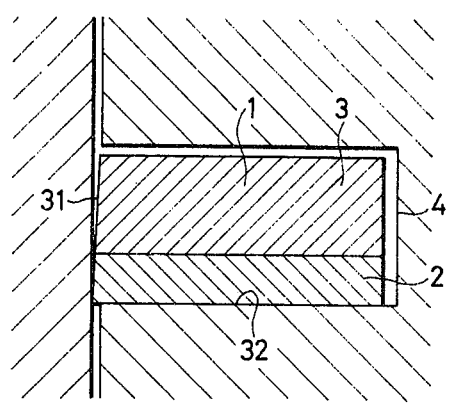

When the piston ring of the invention is placed in an internal combustion engine as shown in FIG. 3, the nearly triangular zone of the second sintered alloy slides on an inner peripheral surface 41 of a cylinder liner. in addition, a bottom surface 32 of the piston ring is forcefully pressed onto a piston ring groove 4 in the vicinity of the triangular zone 2 of the piston ring. This construction markedly reduces the abrasion of the outer peripheral surface and the bottom surface of the piston ring. Furthermore, since the volume of the second sintered alloy 2 can be significantly reduced as shown by comparing FIG. 3 to either FIGS. 1 or 2, the material costs can also be significantly reduced.

In the piston ring of the invention, the volume of the second sintered alloy 2 is controlled so that this volume is kept as small as possible. Reducing the volume of the second sintered alloy offers significant advantages as explained below.

Voids existing in sintered alloys of the piston ring become lubricating oil reservoirs at the sliding surface of the sintered alloy which markedly increases the lubricity of the sliding surface thereby significantly increasing the abrasion resistance of the piston ring at the sliding surface. In the case of externally attached rings with a notch provided therein, e.g., a piston ring, however, such voids are disadvantageous in that they are responsible for the growth of fine cracks. Oxidation occurs in these fine cracks and heat fatigue also occurs. Therefore, as time passes, the tension of the piston ring is lowered. In order to prevent this phenomenon, it is desirable to use high density sintered alloys having a reduced amounted of voids. In producing such high density sintered alloys, it is, of course, desirable to use a fine powder called atomized powder. Such fine powder can be easily produced from low alloyed iron. This low alloyed iron is highly compressible and is suitable for producing high density sintered alloys. Therefore, the heat fatigue phenomenon can be prevented by using these high density sintered alloys.

The piston ring of the present invention is so designed that the volume of the first sintered alloy which comprises the high density low alloyed iron occupies almost all of the volume of the piston ring. Therefore, the piston ring is not prone to the heat fatigue phenomenon described above and therefore it has a stabilized tension. The second sintered alloy layer 2 has a relatively high carbon content (in more detail, 0.7 to 2.0 by weight) and a high hardness. As indicated above, it is preferred to increase the abrasion resistance of the second sintered alloy layer 2 by appropriately choosing the powder size and increasing the volume of voids so that the lubricating oil can be sufficiently held in the voids. Since the second sintered alloy layer 2 has a small volume and, therefore, exerts only limited influences on the tension of the piston ring, it is possible to obtain a piston ring having a stabilized abrasion resistant tension.

A method of producing the piston ring of the invention comprises a series of working steps illustrated in FIG. 4. This method of production comprises the following steps:

1st Step: A core rod 6 with a step 60 and a die 5 are lifted to form a first space 51 (FIG. 4(a)).

2nd Step: A first powder A is charged into the first space 51 with a first feed shoe 91 (FIG. 4(b)).

3rd Step: The die 5 and the core rod 6 are lifted so that the top surface of the first powder A forms a shape nearly equal to the rest curve thereof over the step of the core rod 6 and a lower punch 7 thereby forming a second space 52 above the top surface of the first powder (FIG. 4(c)).

4th Step: A second powder B is charged into the second space 52 by means of a second feed shoe 92 (FIG. 4(d)).

5th Step: An upper punch 8 is lowered to perform compression molding of the powders A,B. Alternatively the upper punch 8 is lowered until it reaches the upper surface of the powder B. Then the die 5 and the core rod 6 are lowered until the height of the bottom of the core rod step 60 is equal to the height of the top surface of the lower punch 7. The die 5 and the core rod 6 are stopped at this point. Then the upper punch 8 is lowered to perform the powder compression molding (FIG. 4(e)).

6th Step: The die 5 and the core rod 6 are lowered, and simultaneously the upper punch 8 is lifted to remove a powder compression molded article (FIG. 4(f)).

7th Step: The article thus produced is sintered and the surface thereof is subjected to dimensional working.

Figure 5:
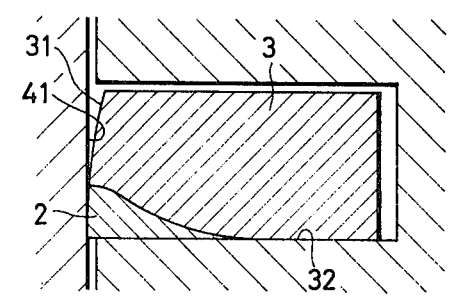
FIG. 5 is a cross-sectional view of another piston ring of the invention.

Although the above explanation has been directed to an embodiment wherein the lower punch 7 is fixed, it goes without saying that the object of the invention can also be formed by a method in which the die 5 is fixed as long as the relative movements of the die, lower punch and upper punch correspond to those in the method of production shown in FIG. 5. Moreover, the 1st, 2nd, 3rd and 4th steps may be performed at the same time (i.e., suction type charging).

The above described method of production allows a piston ring to be easily produced and thus is most suitable for the production thereof although the invention is not limited thereto.

By controlling the rate and amount by which the die 5 is raised, the shape of the curve formed on the upper surface of the first powder A, which is similar to the rest curve thereof, can be accurately controlled.

The piston ring of the invention is most effective in operation when the second sintered alloy 2 is disposed in the most outer circumferential zone thereof. It is desirable to form the first powder layer A into a tapered form as shown in FIG. 3 or into the half-barrel form as shown in FIG. 5.

After compression, the piston ring of the invention may be subjected to treatments such as infiltration, impregnation and sulfurization which are usually employed when it is used under high temperature high load conditions.

As described above, the invention provides a sintered alloy piston ring which has abrasion resistance only at the necessary areas thereof and yet possesses the required tensile strength. Furthermore, the piston ring of the invention has the advantage that it can be produced relatively inexpensively.

What is claimed is:

1. A piston ring produced by a powder metallurgical method, comprising: first and second zones, said first zone being made of a first sintered alloy powder, said second zone being made of a second sintered alloy powder, said second zone having a nearly triangular shape in cross section, one edge of an outer peripheral surface of the piston ring being a vertex of the second triangular-shaped zone, a boundary between said first and second zones having a rest-curve like shape formed by relative movement between a core rod and a punch after said first sintered alloy powder is deposited on an upper surface of said core rod and punch but prior to said second sintered alloy powder being deposited on said first sintered alloy powder.

2. The piston ring claimed in claim 1, wherein said second sintered zone is located at a maximum outer diameter section of the piston ring.

3. The piston ring claimed in claim 1, wherein said first sintered alloy powder is a high density low alloyed iron powder.

4. The piston ring claimed in claim 3, wherein the second sintered alloy powder is a low density sintered alloy metal powder.

* * * * *